United States Patent [19]

Mortvedt et al.

[11] Patent Number: 4,591,178
[45] Date of Patent: May 27, 1986

[54] QUICK ATTACH FENDER AND METHOD FOR USING SAME

[75] Inventors: Eugene S. Mortvedt; Eugene M. Boster, both of Story City, Iowa

[73] Assignee: Genes' Enterprise Corp., Story City, Iowa

[21] Appl. No.: 630,235

[22] Filed: Jul. 12, 1984

[51] Int. Cl.⁴ .............................................. B62D 25/16
[52] U.S. Cl. ............................... 280/154; 280/154.5 R
[58] Field of Search ......... 280/153, 154.5 R, 154.5 A, 280/154

[56] References Cited

U.S. PATENT DOCUMENTS

| | | | |
|---|---|---|---|
| 817,203 | 4/1906 | Thompson | 280/154 |
| 817,204 | 4/1906 | Thompson | 280/154 |
| 2,679,403 | 5/1954 | Howard | 280/154.5 R |
| 4,377,294 | 3/1983 | Lockwood et al. | 280/154.5 R |

Primary Examiner—David M. Mitchell
Attorney, Agent, or Firm—Zarley, McKee, Thomte, Voorhees & Sease

[57] ABSTRACT

The quick attach fender of the present invention comprises a stationary bracket adapted to be mounted to a vehicle frame. The bracket has at least two horizontally extending shafts which extend from the vehicle frame toward the wheel of the vehicle. Detachably mounted to the bracket is a shield assembly comprising a flat sheet member and a shield frame attached to the sheet member. The shield frame has at least two sleeve members sized and positioned to telescopically slide over the shafts of the bracket so as to support the shield in at least partial covering relation over the wheel. Bolts threadably engage the sleeve members and the horizontal shafts to permit selective attachment and detachment of the sleeve members to the shafts. The fender can be quickly removed by loosening the bolts and sliding the sleeves off of the shafts. Similarly, it can be reattached merely by sliding the sleeves onto the shafts and by tightening the bolts.

6 Claims, 4 Drawing Figures

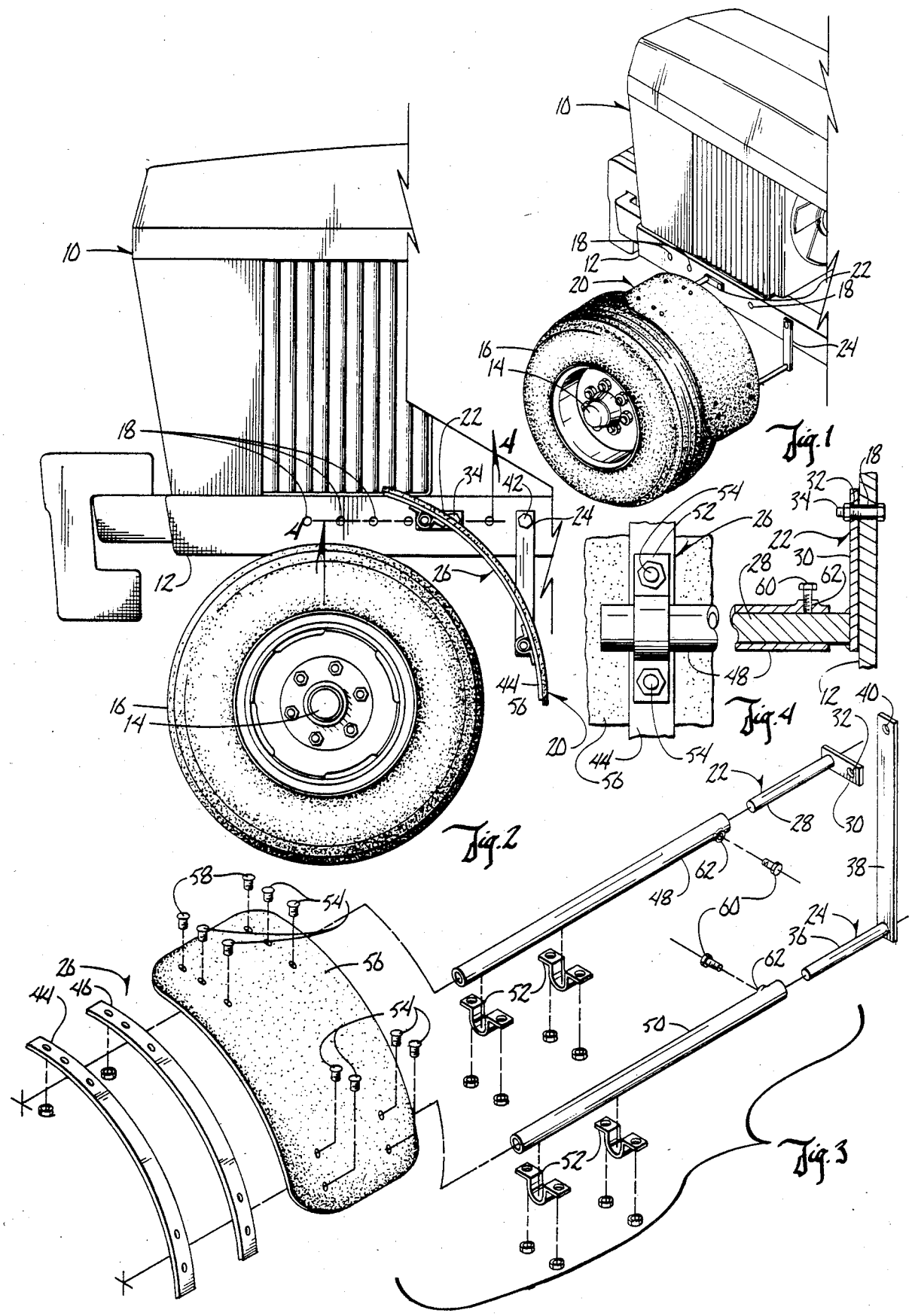

QUICK ATTACH FENDER AND METHOD FOR USING SAME

BACKGROUND OF THE INVENTION

This invention relates to a quick attach fender and method for using the same.

Many vehicles have permanently attached fenders. However, some vehicles, such as farm tractors, do not have permanent fenders because such fenders often interfere with the operation of the vehicle in the field. However, even with farm tractors, at times it is desirable to have fenders to prevent mud from being thrown by the wheels. For example, when moving a tractor from field to field, it is desirable to have a mud flap or fender which will prevent the mud from being thrown all over the operator of the vehicle, and the cab of the vehicle. On some occasions, the mud on the windshield of the vehicle can become a safety hazard, and it is desirable to have protection against the throwing of mud onto the vehicle by the vehicle wheels. One difficulty in providing fenders for farm tractors is the requirement that the fenders be removed when the tractors are used in the field. In the field, the vehicle wheels encounter considerable mud and soil, and the fenders often cause binding when the wheels become mud caked. Therefore, farmers do not want as a general rule, to have fenders on their vehicles when the vehicles are in the field.

Therefore, a primary object of the present invention is the provision of an improved quick attach fender for vehicles and an improved method for using same.

A further object of the present invention is the provision of a fender which can be removed quickly in a matter of a few seconds or minutes.

A further object of the present invention is the provision of a quick attach fender which will readily shed mud or other foreign materials which tend to become caked thereon.

A further object of the present invention is the provision of a quick attach fender which can be utilized with any of a number of various models of farm tractors currently on the market.

A further object of the present invention is the provision of a quick attach fender which will yield when engaged by the wheel of the vehicle, and which will return to its original configuration after having been engaged by the wheel of a vehicle.

A further object of the present invention is the provision of a quick attach fender which is economical to manufacture, durable in use and efficient in operation.

BRIEF SUMMARY OF THE INVENTION

The present invention utilizes a stationary bracket which is attached to the frame of the vehicle adjacent the vehicle wheel. The stationary bracket is attached by bolts to the frame of the vehicle and includes at least a pair of horizontal shafts which extend outwardly away from the frame of the vehicle toward the vehicle wheel.

A shield means is comprised of a flat sheet member and a shield frame attached to the sheet member. The shield frame comprises a pair of spaced apart strips which are formed into an arcuate shape. These strips are interconnected by a pair of sleeves which are attached thereto and which extend perpendicular thereto. The sleeves are sized and shaped to fit in telescopic relationship over the shafts of the stationary brackets.

A flexible sheet member is attached to the shield frame and is preferably made of rubber or some other flexible material. Its flexibility gives it the capability to shed mud which has become caked thereon. After the mud dries, all that is necessary is to flex the rubber and large portions of the mud will fall off. Furthermore, the flexibility of the rubber shield permits the shield to yield in response to engagement by the wheel when it is turned, or when it is covered with mud.

The shield can be quickly and easily mounted to the vehicle merely by sliding the sleeves over the shaft and by securing them to the shafts by set screws, bolts or other means. The device can be similarly removed merely by loosening the set screws or bolts and sliding the sleeves off of the shafts.

BRIEF DESCRIPTION OF THE FIGURES OF THE DRAWINGS

FIG. 1 is a perspective view of the front end of a farm tractor having the detachable fender of the present invention thereon.

FIG. 2 is a side elevational view of the device shown in FIG. 1.

FIG. 3 is a perspective exploded view of the fender of the present invention.

FIG. 4 is an enlarged sectional view taken along line 4—4 of FIG. 2.

DETAILED DESCRIPTION OF THE PREFERRED EMBODIMENT

Referring to the drawings, the numeral 10 generally designates a farm tractor having a tractor frame 12, a wheel axle 14, and a wheel 16 which is rotatably mounted on axle 14. Frame 12 is conventionally provided with a plurality of holes 18 therein.

The numeral 20 generally designates the quick attach fender of the present invention. Fender 20 comprises two stationary brackets 22, 24, and a shield assembly 26. Stationary bracket 22 comprises an elongated horizontal shaft 28 having a bracket plate 30 welded or otherwise attached on one of its ends. Bracket plate 30 includes a bolt receiving hole 32 therein which permits it to be attached to the tractor frame 12 by means of a bolt 34.

Stationary bracket 24 similarly includes a horizontal shaft 36 and an elongated bracket plate 38 having a bolt receiving hole 40 therein. Bracket 24 is secured to frame 12 by means of a bolt 42 which extends through bolt receiving hole 40 and through one of the holes 18 in frame 12.

Shield assembly 26 comprises a shield support frame formed from two spaced apart metal straps 44, 46 and two elongated sleeves or tubes 48, 50. The sleeves 48, 50 are positioned in perpendicular relationship to the straps 44, 46. A pair of brackets 52 engage each of the sleeves 48, 50 and are bolted to the undersurfaces of straps 44, 46 by means of a plurality of bolts 54. Resting on the top of straps 44, 46 is a flexible sheet material or flap 56. Bolts 54 also extend through flap 56 so as to secure the flaps 56, the straps 44, 46, and the sleeves 48, 50 together in a unitary configuration. Additional bolts 58 may be used to provide additional securement of sheet member 56 to straps 44, 46.

Sheet material 56 may be constructed of any sheet material, but preferably it should be constructed of a flexible material such as rubber which will yield and bend in response to being engaged by wheel 16 or in response to manual manipulation. This flexibility provides several advantages. The first advantage is obtained when mud begins to cake or form on the fender. By flexing the rubber material of sheet member 56, it is possible to remove the mud from the fender. Another advantage is obtained when the wheel engages the fender inasmuch as the fender will yield to this pressure without becoming bent or permanently deformed. Rigid materials such as metal often become bent and deformed when they are engaged by the wheel, particularly when the wheel is covered or caked with mud.

In order to mount the shield assembly 26 to the stationary brackets 22, 24, it is merely necessary to slide sleeves 48, 50 over shafts 28, 24. Each sleeve 48, 50 is provided with a bolt receiving hole 62. The sleeves 48, 50 are telescopically fitted over shafts 28, 36 until they are in the desired position. Then set screws or bolts 60 are tightened so as to hold the sleeves 48, 50 against further longitudinal or rotational movement on shafts 28, 36.

The brackets 22, 24 are adaptable to various models and forms of tractors. They may be pivoted about bolts 34, 42 so that the shafts 28, 36 are in proper position for receiving the sleeves 48, 50 of the shield assembly 26. However, once the position of the brackets 22, 24 has been properly ascertained, these brackets may be secured permanently against movement by tightening of bolts 34, 42. The use of set screws or bolts 60 also adds to the flexibility of the device by providing infinite longitudinal and rotational adjustment of sleeves 48, 50 with respect to shafts 22, 24.

The attaching and detaching of the shield assembly 26 is easily accomplished merely by sliding the sleeves 48, 50 over shafts 28, 36 and by either tightening or loosening bolts 60. When the farmer desires to transport the tractor over a road or highway, he can merely slip the sleeves 48, 50 into place and secure them in position by means of bolts 60. The fenders will then prevent the mud from being thrown upwardly onto the windshield and the cab during the movement of the tractor at higher speeds. When the farmer reaches the field, he can quickly detach the fenders merely by removing bolts 60 and slipping sleeves 48, 50 off of shaft 28, 36. The fenders may be placed at the side of the field until the field operation is complete and then may be reattached by transporting the tractor again at higher speeds. The device is believed to add substantially to the safety of the tractor during movement of the tractor at higher speeds on highways and roads. Because it can be easily attached and detached, it is believed to be readily usable by farmers. Furthermore, the device can be mounted upon any of a number of different shapes and sizes of vehicles.

Thus, it can be seen that the device accomplishes at least all of its stated objectives.

What is claimed is:

1. A quick attach fender for a vehicle having a vehicle frame, a wheel axle connected to said vehicle frame, and a wheel rotatably mounted to said axle, said fender comprising:

stationary bracket means adapted to be mounted to said vehicle frame, said bracket means having at least two horizontally extending shafts which extend from said vehicle frame toward said wheel, and which terminate in shaft ends;

shield means comprising a flat sheet member having opposite ends and opposite sides and a shield frame attached to said sheet member, said shield frame having at least two sleeve members sized and positioned to telescopically slide over said shaft ends of said horizontally extending shafts of said bracket means whereby said shield frame and said bracket means will cooperate to support said sheet members in at least partial covering relation over said wheel;

securing means detachably engaging said sleeve members and said horizontal shafts to permit selective attachment and detachment of said sleeve members to said shaft;

said shield frame comprising at least two elongated spaced apart parallel rigid strap members each being attached to said two sleeve members in perpendicular relationship thereto, said strap members being arcuate along their lengths and being positioned in approximately concentric relation to said wheel;

said sheet member being made from a flexible material which will resiliently deflect and return to its original shape in response to impacting forces, said sheet member being attached to said spaced apart rigid strap members with said strap members being positioned in inward spaced relation from said opposite sides and opposite ends of said sheet members whereby said opposite sides and opposite edges of said sheet member are free for limited deflection in response to being exposed to impacting forces.

2. A quick attach fender according to claim 1 wherein said flexible material comprises rubber.

3. A quick attach fender according to claim 1 wherein said securing means comprises bolt means engaging each of said sleeve members and said horizontal shafts to prevent longitudinal telescoping movement therebetween.

4. A quick attach fender for a vehicle having vehicle frame, a wheel axle connected to said vehicle frame, and a wheel rotatably mounted to said axle, said fender comprising:

stationary bracket means adapted to be mounted to said vehicle frame, said bracket means comprising at least two bracket members, each of said bracket members comprising an elongated horizontal shaft having first and second opposite ends and a bracket plate rigidly connected to said first end of said shaft and extending perpendicular thereto;

bolt means for attaching each of said bracket plates to said vehicle frame, said bolt means being threadably adjustable from an adjustment position permitting pivotal movement of said bracket plate with respect to said vehicle frame about a horizontal pivot axis spaced from the longitudinal axis of said shaft to a tightened position holding said bracket plate against pivotal movement with respect to said vehicle frame;

shield means comprising a flat sheet member and a shield frame attached to said sheet member, said shield frame having at least two sleeve members sized and positioned to telescopically slide over said second shaft ends of said horizontally extending shafts of said bracket means whereby said shield frame and said bracket means will cooperate to support said sheet members in at least partial covering relation over said wheel;

securing means detachably engaging said sleeve members and said horizontal shafts to permit selective attachment and detachment of said sleeve members to said shaft.

5. A method for using a quick attach fender for a vehicle having a vehicle frame, a wheel axle connected to said vehicle frame, and a wheel rotatably mounted to said axle, said fender comprising stationary bracket means adapted to be mounted to said vehicle frame, said bracket means comprising at least two bracket members, each of said bracket members comprising an elongated horizontal shaft having first and second opposite ends and a bracket plate rigidly connected to said first end of said shaft and extending perpendicular thereto; bolt means for attaching each of said bracket plates to said vehicle frame, said bolt means being threadably adjustable from an adjustment position permitting pivotal movement of said bracket plate with respect to said vehicle frame about a horizontal pivot axis spaced from the longitudinal axis of said shaft to a tightened position holding said bracket plate against pivotal movement with respect to said vehicle frame; shield means comprising a flat sheet member and a shield frame attached to said sheet member, said shield frame having at least two sleeve members sized and positioned to telescopically slide over said second shaft ends of said horizontally extending shafts of said bracket means whereby said shield frame and said bracket means will cooperate to support said sheet members in at least partial covering relation over said wheel; securing means detachably engaging said sleeve members and said horizontal shafts to permit selective attachment and detachment of said sleeve members to said shaft, said method comprising:

attaching each of said brcket plates to said vehicle frame in a position wherein said bracket plates are in an approximate vertical plane and said shafts extend approximately horizontally;

rotating said bracket means about said horizontal pivot axis while said bolt means are in said adjustment position until said shafts of said bracket means are in a predetermined position relative to said wheel, said shafts also being registrable with said sleeve members when in said predetermined position, moving said bolt means to said tightened position to secure said bracket means against movement from said predetermined position;

sliding said sleeve member of said shield frame over said shafts of said bracket means whereby said sheet member will be supported in at least partial covering relation over said wheel;

detachably securing said sleeves to said shaft so as to prevent sliding movement of said sleeves with respect to said shaft;

removing said shield frame and sheet member by detaching said sleeves from said shafts and sliding said sleeves off from said ends of said shafts.

6. A method according to claim 5 wherein said sheet member is made of a flexible material and is supported by said shield frame under only a portion of its entire area, said method further comprising removing dried mud from said sheet member by flexing said sheet member so as to cause said mud to crumble and fall off said sheet member.

* * * * *